(12) United States Patent
Chiang et al.

(10) Patent No.: US 11,546,603 B2
(45) Date of Patent: Jan. 3, 2023

(54) TRIANGLE PREDICTION WITH APPLIED-BLOCK SETTINGS AND MOTION STORAGE SETTINGS

(71) Applicant: MediaTek Inc., Hsinchu (TW)

(72) Inventors: Man-Shu Chiang, Hsinchu (TW); Chun-Chia Chen, Hsinchu (TW); Chih-Wei Hsu, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/387,618

(22) Filed: Jul. 28, 2021

(65) Prior Publication Data
US 2021/0360255 A1  Nov. 18, 2021

Related U.S. Application Data

(63) Continuation of application No. 16/726,924, filed on Dec. 25, 2019, now Pat. No. 11,122,272.

(60) Provisional application No. 62/784,869, filed on Dec. 26, 2018.

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/137* | (2014.01) |
| *H04N 19/176* | (2014.01) |

(Continued)

(52) U.S. Cl.
CPC ......... *H04N 19/137* (2014.11); *H04N 19/105* (2014.11); *H04N 19/176* (2014.11); *H04N 19/30* (2014.11)

(58) Field of Classification Search
CPC .................................................. H04N 19/119
See application file for complete search history.

(56) References Cited

U.S. PATENT DOCUMENTS

| | | | |
|---|---|---|---|
| 10,893,298 B2 * | 1/2021 | Xu ........................ | H04N 19/176 |
| 2017/0251213 A1 | 8/2017 | Ye et al. | |
| 2020/0029073 A1 * | 1/2020 | Chiang ................. | H04N 19/46 |

(Continued)

OTHER PUBLICATIONS

Chen et al. ("Test Model 3 of Versatile Video Coding (VTM 3)." JVET-L1002, Joint Video Exploration Team (JVET) (Oct. 2018, Macao, CN). (Year: 2018).*

(Continued)

*Primary Examiner* — Fabio S Lima
(74) *Attorney, Agent, or Firm* — Han IP PLLC; Andy M. Han

(57) ABSTRACT

A video coder receives data from a bitstream for a block of pixels to be encoded or decoded as a current block of a current picture of a video. Upon determining that an applied block setting of the current block satisfies a threshold condition, the video coder generates a first prediction based on a first motion information for a first prediction unit of the current block. The video coder generates a second prediction based on a second motion information for a second prediction unit of the current block. The video coder generates a third prediction based on the first and second motion information for an overlap prediction region that is defined based on a partitioning between the first prediction unit and the second prediction unit. The video coder encodes or decodes the current block by using the first, second, and third predictions.

6 Claims, 11 Drawing Sheets

(51) Int. Cl.
*H04N 19/30* (2014.01)
*H04N 19/105* (2014.01)

(56) References Cited

U.S. PATENT DOCUMENTS

| | | | |
|---|---|---|---|
| 2020/0059642 A1* | 2/2020 | Kang | H04N 19/70 |
| 2020/0154101 A1* | 5/2020 | Li | H04N 19/176 |
| 2020/0162728 A1* | 5/2020 | Van der Auwera | H04N 19/593 |
| 2020/0162737 A1* | 5/2020 | Van der Auwera | H04N 19/117 |
| 2020/0195963 A1* | 6/2020 | Li | H04N 19/96 |
| 2021/0006784 A1* | 1/2021 | Lim | H04N 19/11 |
| 2021/0006787 A1* | 1/2021 | Zhang | H04N 19/139 |
| 2021/0006790 A1* | 1/2021 | Zhang | H04N 19/137 |
| 2021/0014496 A1* | 1/2021 | Abe | H04N 19/157 |
| 2021/0037243 A1* | 2/2021 | Abe | H04N 19/136 |
| 2021/0051324 A1* | 2/2021 | Zhang | H04N 19/132 |

OTHER PUBLICATIONS

Taiwan Intellectual Property Office, Office Action for Taiwan Patent Application No. 111105397, dated Jun. 27, 2022.
J. Chen et al., "Algorithm description for Versatile Video Coding and Test Model 3 (VTM 3)," Joint Video Experts Team (JVET) of ITUT SG 16 WP 3 and ISO/IEC JTC 1/SC 29/WG 11, 12th Meeting: Macao, CN, Oct. 3-12, 2018, JVET-L002 (version 2—date Dec. 24, 2018 08:16:02), http://phenix.itsudparis.eu/jvet/doc_end_user/current_document.php?id=4835.

* cited by examiner

M1=Motion1
M2=Motion2

TRIANGLE PREDICTION WITH APPLIED-BLOCK SETTINGS AND MOTION STORAGE SETTINGS

CROSS REFERENCE TO RELATED PATENT APPLICATION(S)

The present disclosure is part of a continuation of U.S. patent application Ser. No. 16/726,924, filed 25 Dec. 2019, which claims the priority benefit of U.S. Provisional Patent Application No. 62/784,869, filed 26 Dec. 2018. Contents of aforementioned applications are herein incorporated by reference.

TECHNICAL FIELD

The present disclosure relates generally to video processing. In particular, the present disclosure relates to coding pixel blocks by prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a method for implementing a target merge mode comprising triangular prediction unit mode (TPM). A video coder receives data from a bitstream for a block of pixels to be encoded or decoded as a current block of a current picture of a video. Upon determining that a set of applied block settings of the current block satisfies a threshold condition, the video coder computes/generates a first prediction based on a first motion information for a first prediction unit of the current block. The video coder computes/generates a second prediction based on a second motion information for a second prediction unit of the current block. The video coder computes/generates a third prediction based on the first and second motion information for an overlap prediction region that is defined based on a partitioning between the first prediction unit and the second prediction unit. The video coder encodes or decodes the current block by using the first, second, and third predictions. For the partitioning bifurcating the current block is from left-top corner for current block to right-bottom corner for current block, the target merge mode refers to TPM. The partitioning bifurcating the current block can be a straight line represented by an angle and/or a distance from the center of current block.

In some embodiments, the set of applied block settings satisfies the threshold condition when a width, a height, an area, or a long side to short side ratio of the current block is greater than (or less than) a threshold. In some embodiments, a boundary motion vector is stored for a boundary grid located in the overlap prediction region to be used for coding a subsequent block of pixels. The boundary motion vector is determined based on the first motion vector and/or the second motion vector.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Target Merge Mode

Figure 1:
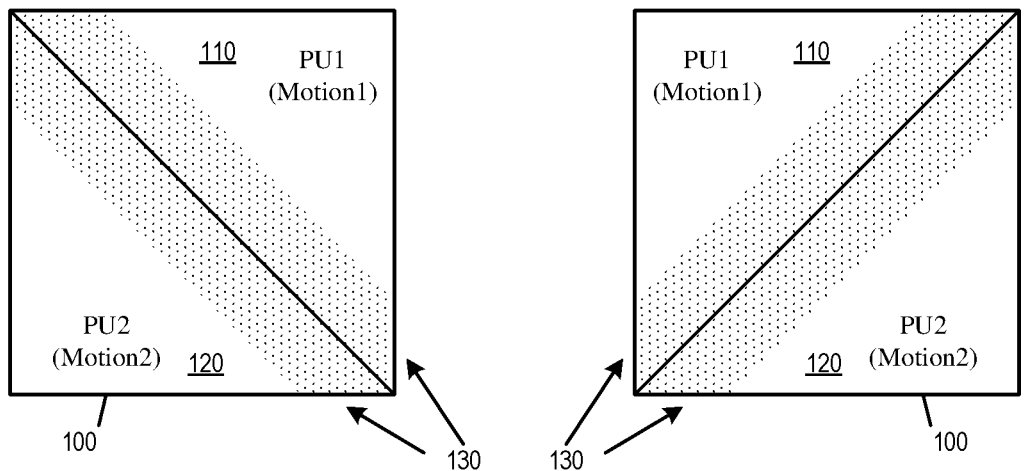
FIG. 1 conceptually a CU that is coded by triangular prediction unit mode.

Some embodiments of the disclosure provide methods for improving the target merge mode comprising triangle prediction unit mode (TPM, or triangular prediction). Triangular prediction unit mode introduces a triangular partition for motion compensated prediction. FIG. 1 conceptually a CU 100 that is coded by triangular prediction unit mode, which is an embodiment of the target merge mode. As illustrated, the CU 100 is split into two triangular prediction units 110 (PU1) and 120 (PU2), in either diagonal or inverse diagonal direction, by a partitioning that is a straight line or a diagonal line that bifurcates the CU 100. In some other embodiments, the two prediction units in the CU 100 coded in the target merge mode, which are split by the straight line, may not be in shape of triangle, which should not be limited in this disclosure. For the target merge mode, each prediction unit (for TPM, triangle prediction unit) in the CU is inter-predicted by using its own uni-prediction motion vector and reference frame index which are derived from a candidate list which consist of bi-prediction candidates or uni-prediction candidates. In the example of FIG. 1, the triangular prediction unit 110 is inter-predicted using the first motion information (Motion1) containing motion vector Mv1 and the corresponding reference index, and the triangular prediction unit 120 is inter-predicted using the second motion information (Motion2) containing motion vector Mv2 and the corresponding reference index. In some embodiments, an overlap prediction region 130 situated over the diagonal boundary between the two triangular partitions is inter-predicted by a weighted sum of the inter-predictions by the first and the second motion information. The overlap prediction region 130 may therefore also be referred to as a weighted area or boundary region.

Figure 2:
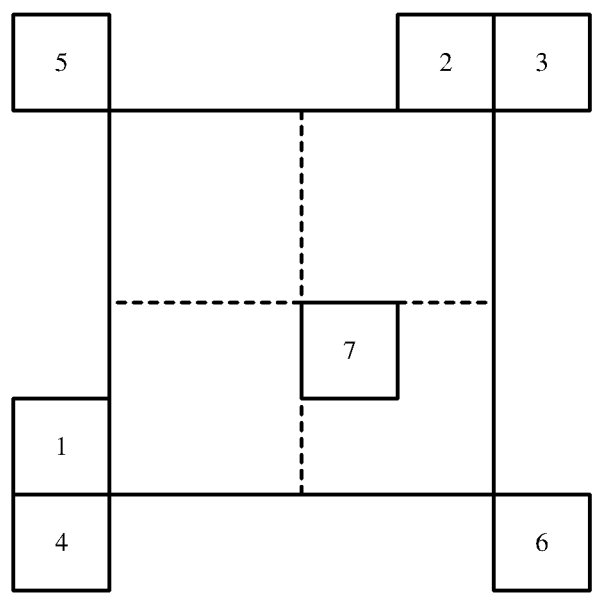
FIG. 2 illustrates the spatial referenced blocks and temporal referenced block for merge mode.

FIG. 2 illustrates the spatial reference blocks and temporal referenced blocks for generating the candidate list for merge mode. As illustrated, the candidate list used in the target merge mode is derived from five spatial neighboring blocks (1 to 5) and/or two temporal co-located blocks (6 to 7).

After predicting each prediction unit, an adaptive weighting process is applied to the edge between the two prediction units to derive the final prediction for the whole CU. The adaptive weighting process is performed to the diagonal edge after predicting the triangular prediction units. Then, the transform and quantization process are applied to the whole CU. It is noted that this mode is only applied to skip and/or merge modes.

Figure 3:
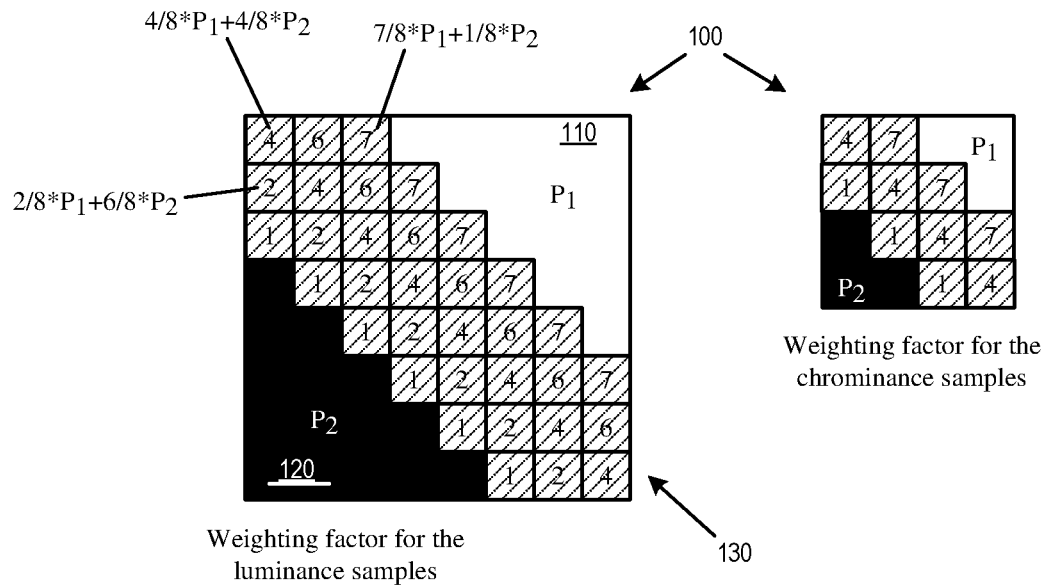
FIG. 3 illustrates applying an adaptive weighting process to the diagonal edge between the two triangular prediction units.

FIG. 3 illustrates applying an adaptive weighting process to the diagonal edge between the two triangular prediction units 110 and 120 (i.e., the overlap prediction region 130).

Two weighting factor groups are listed as follows:

$1^{st}$ weighting factor group: {7/8, 6/8, 4/8, 2/8, 1/8} and {7/8, 4/8, 1/8} are used for the luminance and the chrominance samples, respectively;

$2^{nd}$ weighting factor group: {7/8, 6/8, 5/8, 4/8, 3/8, 2/8, 1/8} and {6/8, 4/8, 2/8} are used for the luminance and the chrominance samples, respectively.

In some embodiments, one weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the 1st weighting factor group is used. In another embodiment, only one weighting factor group is used. In another embodiment, the weighting factor for each sample is derived according to the distance between the sample and the straight line for partitioning. The example of FIG. 3 illustrates the CU 100 applying the 1st weighting factor group to the weighted area (or overlap prediction region) 130 along the diagonal boundary between the triangular prediction unit 110 and the triangular prediction unit 120.

II. Applied Block Settings

In some embodiments, the target merge mode is only applied to CUs in skip or merge mode. Furthermore, the block size of the CUs cannot be smaller than 8×8. For a CU coded in a skip or merge mode, a CU level flag is signaled to indicate whether the target merge mode is applied or not for the current CU. When the target merge mode is applied to the CU, the syntax containing an index indicating the direction for splitting the CU into two prediction units and/or two indices indicating the motion candidates of the two prediction units are signaled.

In some embodiments, applied block settings are used to improve the performance and reduce the complexity of triangular prediction. In some embodiments, the applied block settings can be implicitly derived by the block width and/or block height or be explicitly indicated by a flag signaled at CU level, CTU level, slice level, tile level, tile group level, SPS level, PPS level or be any combination of above.

Applied block settings refer to settings such as block width, block height, and/or block area that are used to determine whether to enable the target merge mode for a block such as the block 100. If triangle prediction is enabled, the triangle prediction syntax, including a CU-level flag and the syntax containing some indices (signaled in case that CU-level flag equal to 1) is transmitted; otherwise, the syntax is bypassed and that CU-level flag is inferred to be 0.

In some embodiments, the target merge mode is enabled for the block when the block's area is larger than or smaller than a threshold. In some embodiments, the block's area can be represented using the block's width, height or any other parameter related to the block's area. In some embodiment, the target merge mode is enabled for the block when the block's width and/or height are larger than or smaller than a threshold. The threshold can be fixed at 4, 8, 16, 32, 64, 128, 256, 512, 1024, 2048, 4096 or the maximum transform size specified in the standard, etc. The threshold may also vary according to a predefined rule. For example, the predefined rule may specify that an index is signaled to select the threshold. The index can be signaled at CU level, CTU level, slice level, tile level, tile group level, SPS level, PPS level or be any combination of above. For another example, the predefined rule may specify that the threshold be implicitly derived depending on the picture width, picture height, picture area, temporal layer, or picture texture.

In some embodiments, the target merge mode is enabled for the block when the ratio of the long side and the short side of the block, denoted as R, where R=long side/short side, is smaller than or larger than a threshold. The threshold can be fixed at 1, 2, 3, 4, 5, 6, 7, 8, etc. The threshold may also vary according to a predefined rule. For example, the predefined rule may specify that an index be signaled to select the threshold. The index can be signaled at CU level, CTU level, slice level, tile level, tile group level, SPS level, PPS level or be any combination of above. For another example, the predefined rule may specify that the threshold be implicitly derived depending on the picture width, picture height, picture area, temporal layer, or picture texture. Any combination of the above may be used to specify the condition for enabling triangular prediction for the block.

III. Motion Vector Storage Settings

When coding a CU by the target merge mode (for example, TPM), in order to make motion information available for coding subsequent CUs (e.g., for constructing a merge mode candidate list), the motion information used for coding the two triangular prediction units (e.g., the triangular prediction unit 110 and the triangular prediction unit 120) and the overlap prediction region (e.g., weighted area 130) are stored. In some embodiments, the CU is divided into 4×4 grids that overlay the two triangular prediction units 110 and 120 and the overlap prediction region 130. For each 4×4 grid, either uni-prediction or bi-prediction motion information is stored depending on the position of the 4×4 grid in the CU. In some embodiments, the motion information being saved for each 4×4 grid is determined by a set of motion vector storage settings.

In some embodiments, the MV storage settings can be implicitly derived by the block width and/or block height or be explicitly indicated by a flag signaled at CU level, CTU level, slice level, tile level, tile group level, SPS level, PPS level or be any combination of above. In some embodiments, MV storage settings and applied block settings are both used to improve the performance of triangular prediction.

Figure 4:
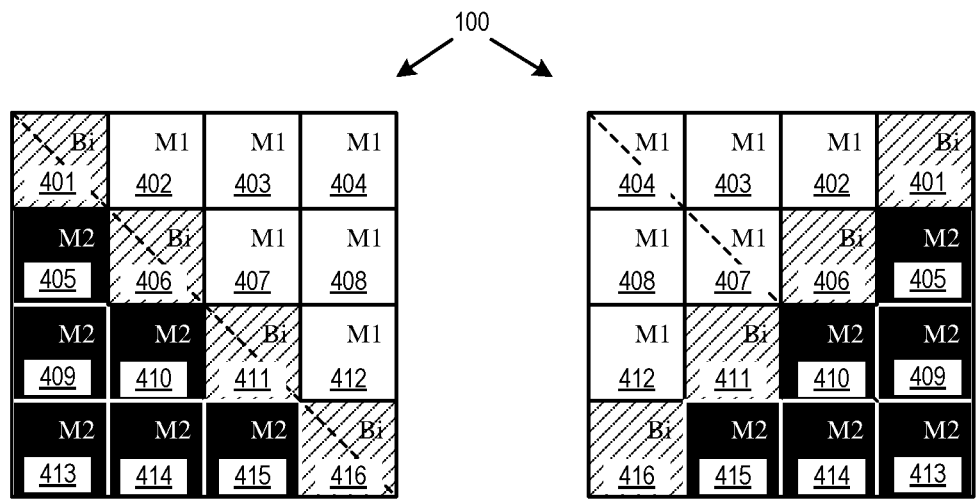
FIG. 4 illustrates the storage of motion vectors for triangular prediction units.

FIG. 4 illustrates the storage of motion vectors for the target merge mode. As illustrated, the CU 100 includes sixteen 4×4 grids 401-416. As illustrated, uni-prediction motion information, either Motion1 or Motion2, is stored for the 4×4 grids located in the non-weighted area (outside of the overlap prediction region 300). In the example, Motion1 is stored for each of 4×4 the grids 402, 403, 404, 407, 408, 412. Motion2 is stored for each of 4×4 grids 405, 409, 410, 413, 414, 415.

On the other hand, a bi-prediction/uni-prediction motion information is derived and stored for each of the 4×4 grids 401, 406, 411, 416 that are located in the overlap prediction region 130. (The grids that are located in the overlap prediction region 130 may be referred to as boundary grids. Each uni-prediction/bi-prediction motion information derived and stored for each boundary grid may be referred to as a boundary motion vector.) The bi-direction/uni-prediction motion information is derived from Motion1 and/or Motion2 according to rules (i.e., MV storage settings) that are defined based on Motion1 and Motion2. FIGS. 5a-d illustrate different scenarios for deriving the bi-direction/uni-prediction motion information for storage for the target merge mode. The figures illustrate the CU 100 being coded by using TPM, with the triangular prediction unit 110 using Motion1 for inter-prediction and the triangular prediction unit 120 using Motion2 for inter-prediction. The figures also illustrate a sequence of video pictures having different picture order counts (POCs), including a picture 500 with POC=0, a picture 504 with POC=4, a picture 508 with POC=8, and a picture 516 with POC=16. The CU 100 is in the picture 504 (so the picture 504 is the current picture and POC=4 is the current POC), thus for CU, the picture 500 is in L0 and the pictures 508 and 516 are in the L1.

Figure 5A:
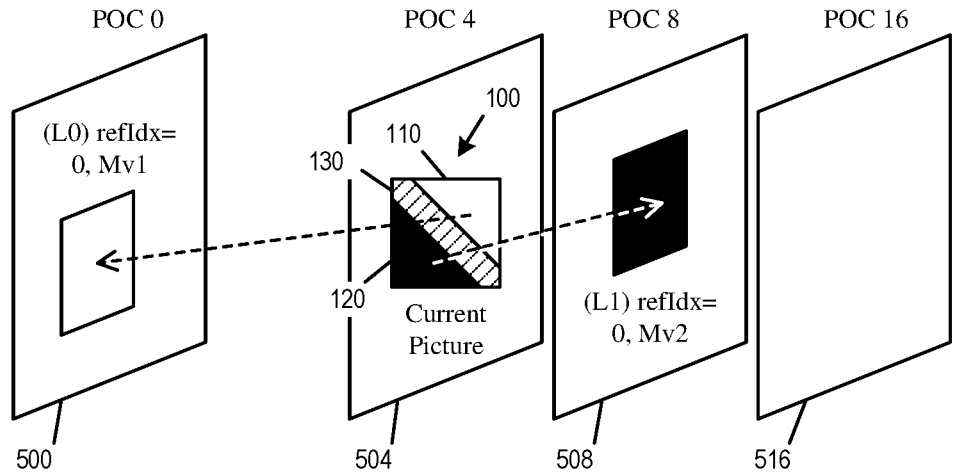
FIGS. 5a-d illustrate different scenarios for deriving the bi-direction motion vector for storage for triangular prediction unit mode.

FIG. 5a illustrates a scenario in which Mv1 and Mv2 are motion vectors with different lists (L0 or L1). As illustrated, Mv1 is referencing pixels in picture 500 in L0 and Mv2 is referencing pixels in picture 508 in the L1. When deriving a bi-prediction motion vector based on Mv1 and Mv2 in different lists, Motion1 and Motion2 may be combined to form the bi-prediction motion information to be stored for 4×4 grids in the weighted area 130 in some embodiments.

Figure 5B:
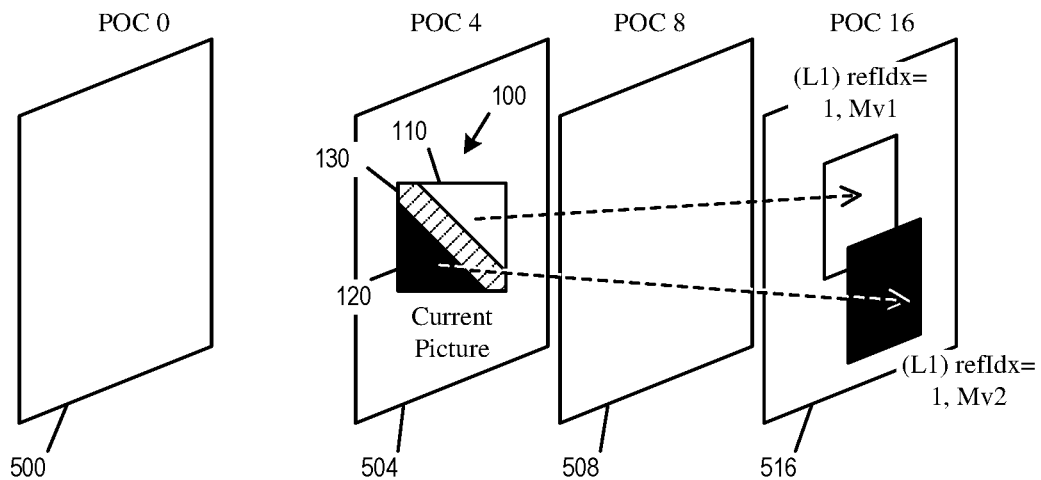

FIG. 5b illustrates a scenario in which Motion1 and Motion2 have the same reference picture (index). As illustrated, both Mv1 and Mv2 are referencing pixels in picture 516 in L1. In some embodiments, when both Mv1 and Mv2 are from the same L0 (or L1) and that Motion1 and Motion2 have the same reference picture (index), only Motion1 or Motion2 is stored for 4×4 grids in the weighted area 130 in some embodiments.

Figure 5C:
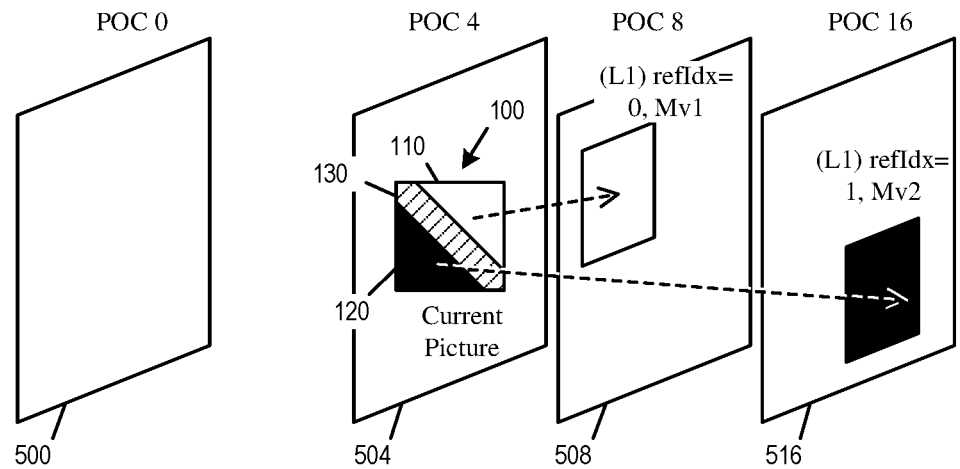
Figure 5D:
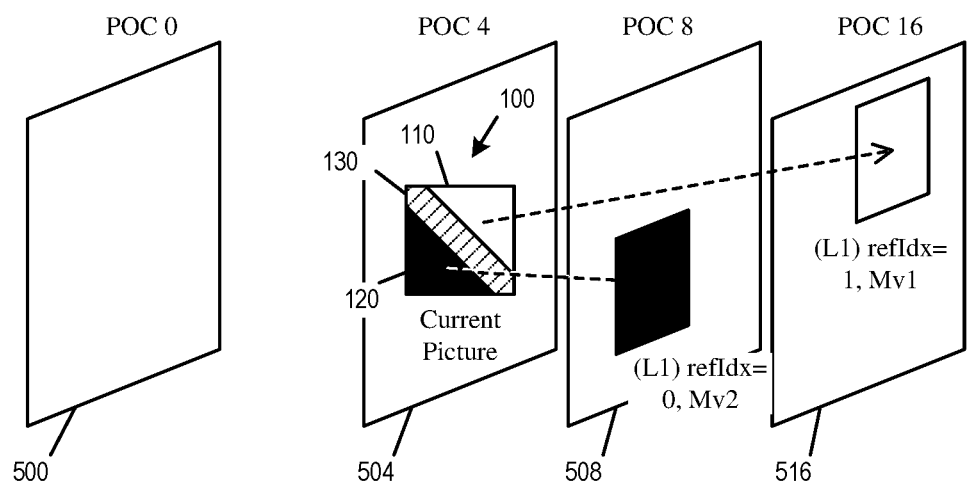

FIGS. 5c-d illustrate scenarios in which Mv1 and Mv2 are from the same L0 (or L1) but with different reference pictures (index). In the example of FIG. 5c, Mv1 is referencing pixels in picture 508 and Mv2 is referencing pixels in picture 516. In the example of FIG. 5d, Mv1 is referencing pixels in picture 516 and Mv2 is referencing pixels in picture 508. Both pictures 508 and 516 are in L1. In some embodiments, Mv2 is scaled to the picture (index) of Motion1 and the scaled Mv2 are combined with Mv1 to form the motion vector to be stored for 4×4 grids located in the weighted area 130. On the other hand, Mv1 is scaled to the picture (index) of Motion2 and the scaled Mv1 are combined with Mv2 to form the motion information to be stored for 4×4 grids located in the weighted area 130.

In some other embodiments, a uni-prediction motion vector (either Motion1 of the triangular prediction unit 110 or Motion2 of the triangular prediction unit 120) is stored for 4×4 grids located in the weighted area 130 when Motion 1 and Motion 2 are with the same reference list (List0 or List 1). In some embodiments, Motion1 is chosen as the uni-prediction motion information stored for each 4×4 grid located in the weighted area 130 when Motion 1 and Motion 2 are with the same reference list (List0 or List 1). In some embodiments, Motion2 is chosen as the uni-prediction motion information stored for each 4×4 grid located in the weighted area 130 when Motion 1 and Motion 2 are with the same reference list (List0 or List 1).

In some embodiments, the uni-prediction motion information stored for each 4×4 grid located in the weighted area is chosen from either Motion1 or Motion2 according to a predefined rule. The predefined rule may be related to (or defined based on) the POCs (of the reference pictures) referred by Motion1 and Motion2. For example, if the distance between the current POC and the POC referred by the motion information $Motion_i$, where i=1 or 2, is smaller than the distance between the current POC and the POC referred by the motion information $Motion_j$, where j=1 or 2 and j is not equal to i, $Mv_i$ is chosen as the uni-prediction motion vector for each 4×4 grid located in the weighted area. In the example of FIG. 5c, since the distance between current POC (POC=4) and the POC of the picture referenced by Motion1 (POC=8) is smaller than the distance between the current POC and the POC of the picture referenced by Motion2 (POC=16), Mv1 is chosen as the uni-prediction motion vector to be stored for each 4×4 grid located in the overlap prediction region 130. In the example of FIG. 5d, since the distance between current POC (POC=4) and the POC of the picture referenced by Motion2 (POC=8) is smaller than the distance between the current POC and the POC of the picture referenced by Motion1 (POC=16), Motion2 is chosen as the uni-prediction motion information to be stored for each 4×4 grid located in the overlap prediction region 130.

In some embodiments, the uni-prediction motion information stored for each 4×4 grid located in the weighted area is generated from Motion1 and Motion2 by averaging Motion1 and Motion2 with predefined weights. If the reference indices of Motion1 and Motion2 are the same (e.g., the example of FIG. 5b) and in the same reference list, the motion vector values of Mv1 and Mv2 are directly averaged to generate the uni-prediction motion vector to be stored for each 4×4 grid in the weighted area 130. Otherwise (e.g., the examples of FIG. 5c and FIG. 5d), variances of averaging Mv1 and Mv2 are used to generate the uni-prediction motion vector to be stored for each 4×4 grid in the weighted area 130. For example, in some embodiments, the motion vector values of Mv1 and Mv2 are directly averaged with one reference index from either Mv1 or Mv2 is chosen, regardless of the different reference indices. In some embodiments, Mv1 or Mv2 is scaled to the same POC, and the (scaled) motion vector values of Mv1 and Mv2 are averaged, and one reference index from either Mv1 or Mv2 is chosen.

When averaging the motion vector values of Mv1 and Mv2, different variances of weighting can be used. One is to applying equal weights to Mv1 and Mv2. Another is to change the weights depending on the positions of 4×4 grids. For the 4×4 grids nearing a position in which $Mv_i$ (where i=1 or 2) is applied, the weight for $Mv_i$ is larger than the weight for $Mv_j$, where j=1 or 2 and j is different from i. (For a 4×4 grid near a position in which Mv1 is applied, the weight for Mv1 is greater than the weight for Mv2. Conversely, for a 4×4 grid near a position in which Mv2 is applied, the weight for Mv2 is greater than weight for Mv1.)

IV. Example Video Encoder

Figure 6:
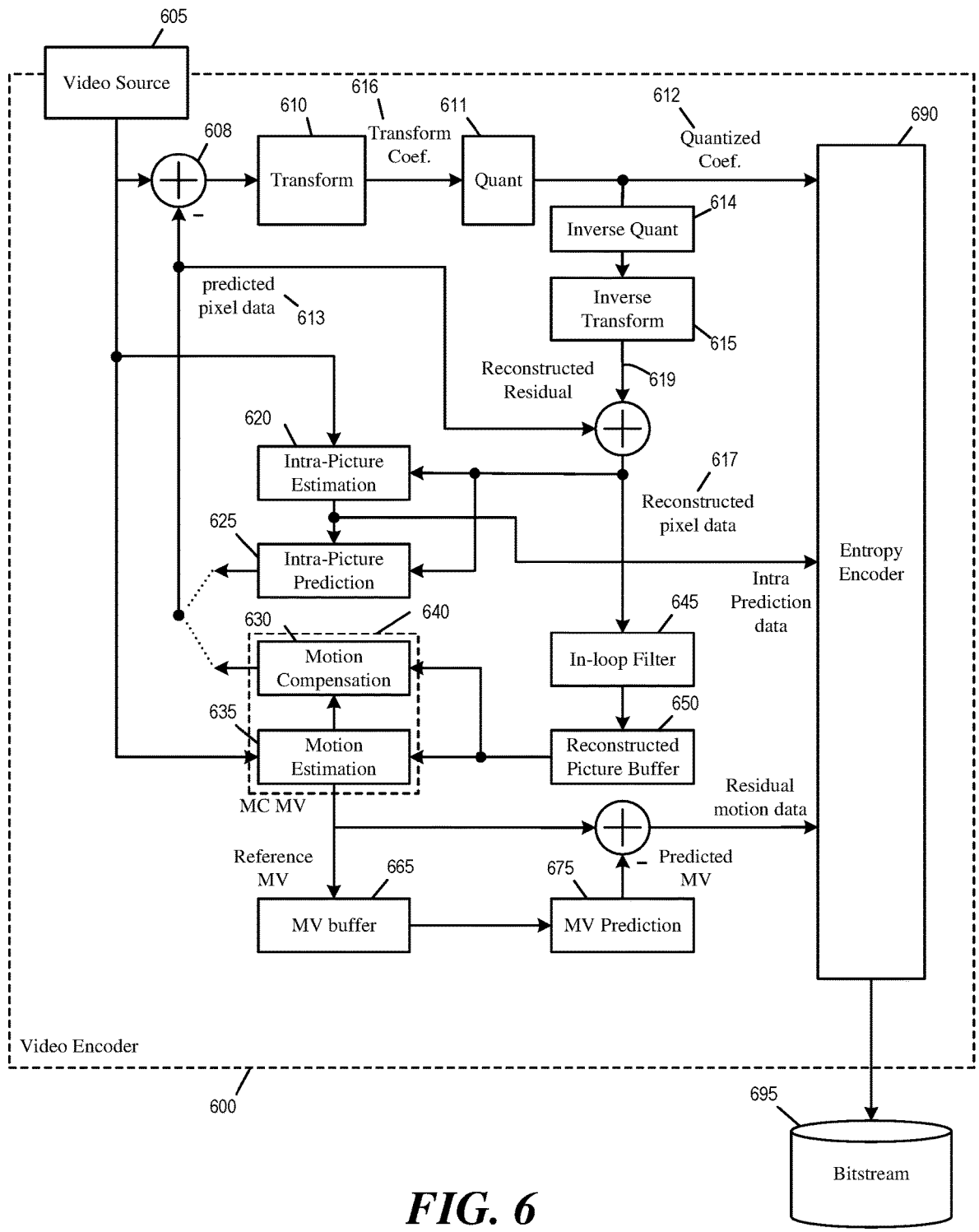
FIG. 6 illustrates an example video encoder capable of implementing target merge mode.

FIG. 6 illustrates an example video encoder 600 capable of implementing the target merge mode (including triangular prediction unit mode). As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
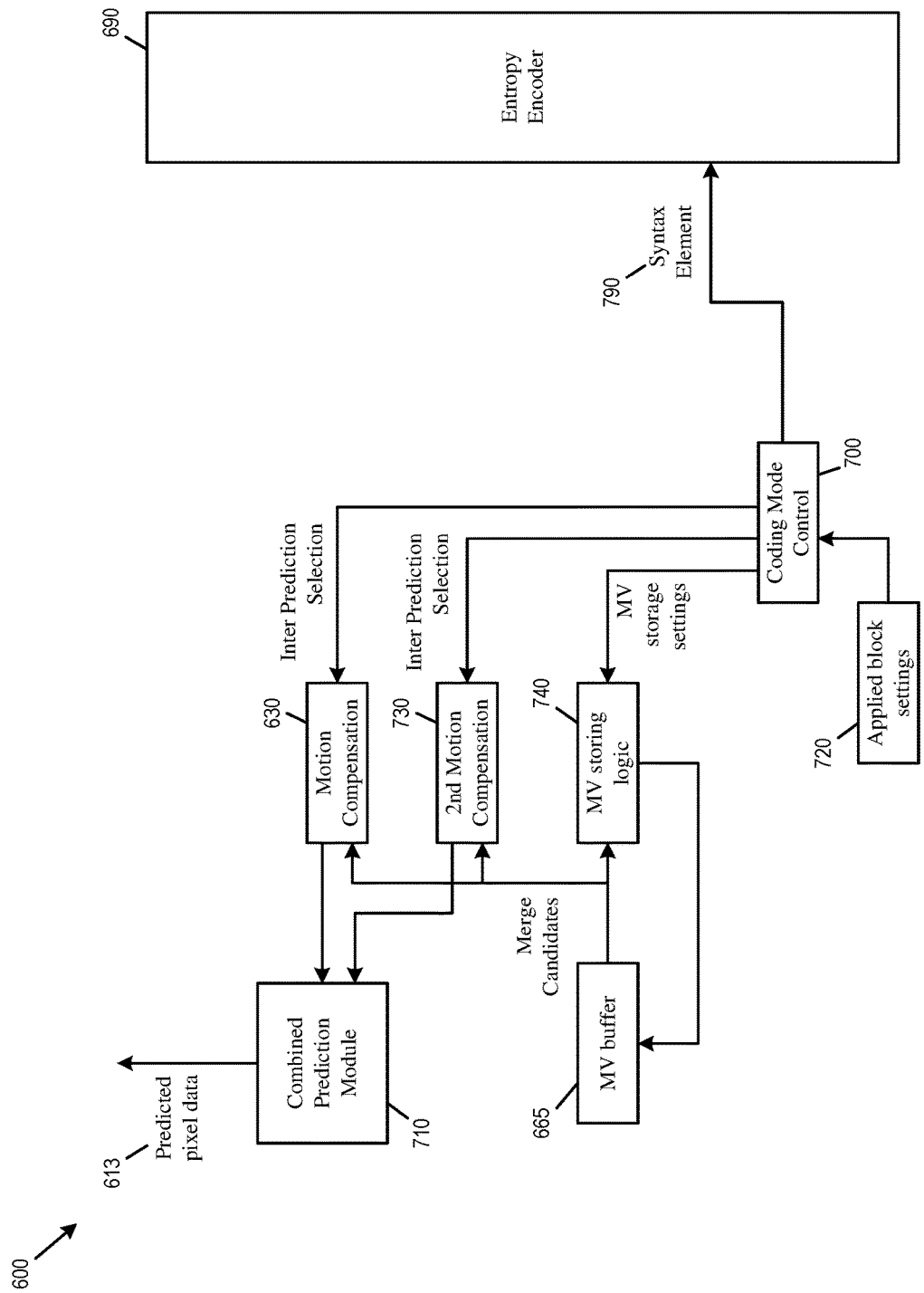
FIG. 7 illustrates portions of the video encoder that implement target merge mode.

FIG. 7 illustrates portions of the video encoder 600 that implement target merge mode (including triangular prediction unit mode). As illustrated, the video encoder 600 implements a combined prediction module 710, which produces the predicted pixel data 613. The combined prediction module 710 may receive inter-prediction values from the motion compensation module 630, as well as a second motion compensation module 730.

The MV buffer 665 provides the merge candidates to the motion compensation modules 630 and 730. The MV buffer 665 stores the motion information and the mode directions used to encode the current block for use by subsequent blocks.

A MV storage logic 740 determines or computes the motion information to be stored in the MV buffer 665. For example, when TPM is enabled, the MV storage logic may decide whether to store Motion1 (the motion vector and reference index of PU1) or Motion2 (the motion vector and reference index of PU2) or a combination of Motion1 and Motion 2 (average of Mv1 and Mv2 and a derived or pre-define reference index). The MV storage logic 740 may divide the current CU into (e.g., 4×4) grids and computes the motion information to store for each grid based on the position of the grid. For example, for a grid located in the overlap prediction region 130, the MV storage logic 740 stores a boundary motion vector that is determined based on Motion1 and/or Motion2. Such a boundary motion information may be selected to be either Motion1 or Motion2 based on a predefined rule, or be computed as the combination of Motion1 and Motion2 with an average of Mv1 or Mv2 and reference index based on a predefined rule. Such predefined rules may weigh Mv1 and Mv2 based on their respective POCs, the position of the grid for which the motion information is computed, etc.

A coding mode (or tool) control module 700 controls the operations of the motion compensation module 630, and the second motion compensation module 730. The coding mode control module 700 may enable the motion compensation module 630 and the second motion compensation module 730 to implement a target merge mode with multi-hypothesis prediction based on two inter-predictions, such as TPM. The coding mode control module 700 determines which coding modes to enable and/or disable for coding the current block. The coding mode control module 700 also determines which merge candidates to use for each grid or partition of the current block. The coding mode may decide which coding mode(s) to enable or disable based on a set of applied block settings 720 (e.g., the width, the height, and/or the area of the block). The coding mode control 700 may generate or signal a syntax element 790 to the entropy encoder 690 to indicate whether a target merge mode is enabled or not. The syntax element 790 may be bypassed when the applied block settings 720 fails to meet certain criteria or threshold. When the syntax element 790 is signaled and the target merge mode is enabled, more syntax elements containing an index indicating the direction for splitting the CU into two prediction units and/or two indices indicating the motion candidates of the two prediction units may be signaled.

Figure 8:
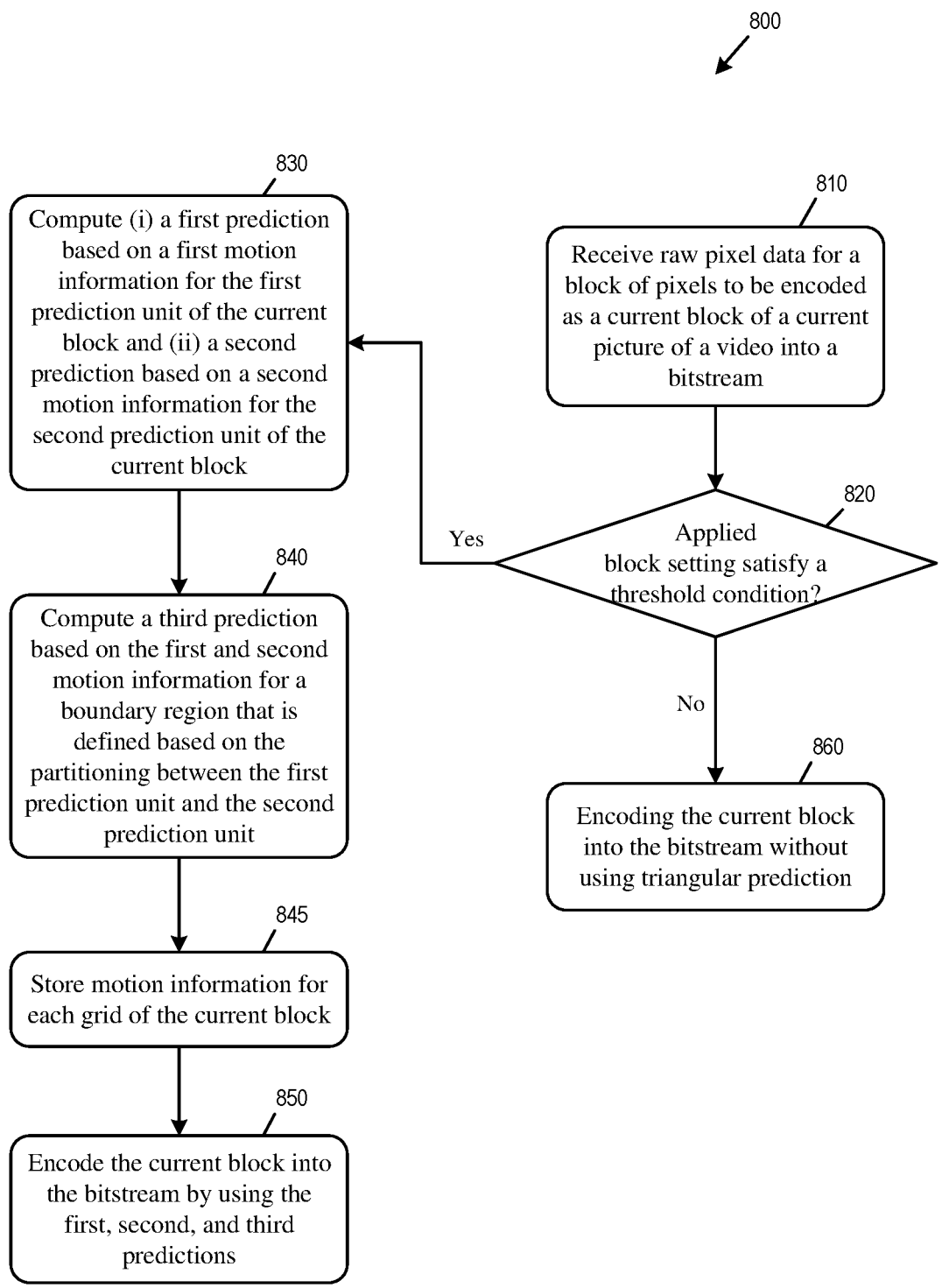
FIG. 8 conceptually illustrates a process for performing target merge mode at an encoder.

FIG. 8 conceptually illustrates a process 800 for performing target merge mode (including triangular prediction mode) at an encoder. In some embodiments, one or more processing units (e.g., a processor) of a computing device implementing the video encoder 600 performs the process 800 by executing instructions stored in a computer readable medium. In some embodiments, an electronic apparatus implementing the video encoder 600 performs the process 800.

The video encoder receives (at block 810) raw pixel data for a block of pixels to be encoded as a current block of a current picture of a video into a bitstream. The video encoder determines (at block 820) whether a set of applied block settings of the current block satisfies a threshold condition. The set of applied block settings may include a width, a height, an area, or a ratio (of the long side to the short side) of the current block. In some embodiments, the set of applied block settings satisfies the threshold condition when the width, the height, the area, or the long side to short side ratio of the current block is greater than a threshold. In some embodiments, the set of applied block settings satisfies the threshold condition when the width, the height, the area, or the long side to short side ratio of the current block is less than a threshold. When the set of applied block settings of the current block satisfies the threshold condition, the process 800 proceeds to 830 to encode the current block by using triangular prediction. When the set of applied block settings of the current block does not satisfy the threshold condition, the process proceeds to 860 to encode the current block without using triangular prediction.

The video encoder computes/generates (at block 830) a first prediction based on a first motion information (that refer to a first reference picture) for the first prediction unit of the current block. The video encoder also computes/generates a second prediction based on a second motion information (that refer to a second reference picture) for the second prediction unit of the current block. The video encoder may compute/generate the first and second predictions independently and/or in parallel. In some embodiments, the partitioning of the first and second prediction units is along a straight line bifurcating the current block. In some embodiments, the partitioning straight line is a diagonal line connecting two opposing vertices of the current block. In some other embodiments, the straight line may be any other line to partition the current block into two prediction units, which should not be limited in this disclosure.

The video encoder computes/generates (at block 840) a third prediction based on the first and second motion information for an overlap prediction region (e.g., 130) that is defined based on the partitioning between the first prediction unit and the second prediction unit.

The video encoder stores (at block 845) motion information for each grid of the current block. In some embodiments, the current block is divided into (e.g., 4-pixel by 4-pixel) grids, and motion information is stored for each grid for use by subsequent blocks to perform operations such as merge mode. In some embodiments, a boundary motion information is stored for a boundary grid located in the overlap prediction region of the current block. The boundary motion information is determined based on the first motion vector and the second motion vector. In some embodiments, the first motion information is selected as the boundary motion information when a first picture order count (POC) difference between the first reference picture and the current picture is less than a second POC difference between the second reference picture and the current picture, and the second motion information is selected as the boundary motion information when the second POC difference is less than the first POC difference. In some embodiments, the boundary motion information is computed by averaging the first motion vector and the second motion information. Each of the first and second motion information may be weighted based on a spatial position of the boundary grid relative to a first grid in which the first motion information is applied to compute the first prediction or a second grid in which the second motion information is applied to compute the second prediction. In some embodiments, at least one of the first and second motion information is scaled based on a POC of the first reference picture, a POC of the second reference picture, and a POC of the current picture when computing the boundary motion information by averaging the first and second motion information.

The video encoder encodes (at block 850) the current picture into the bitstream by using the first, second, and third predictions.

V. Example Video Decoder

Figure 9:
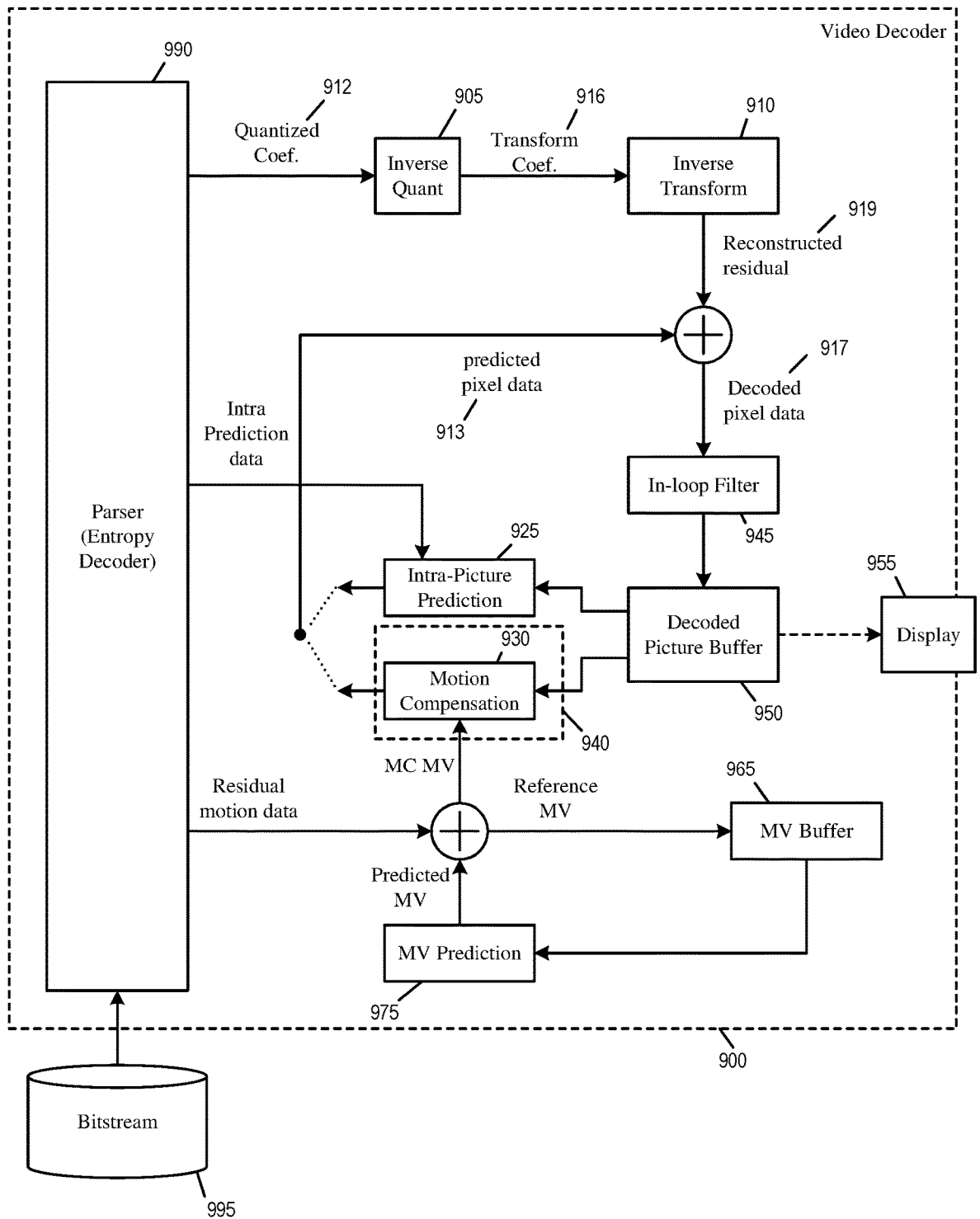
FIG. 9 illustrates an example video decoder capable of implementing target merge mode.

FIG. 9 illustrates an example video decoder 900 capable of implementing target merge mode (including triangular prediction unit mode). As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 905, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 905 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
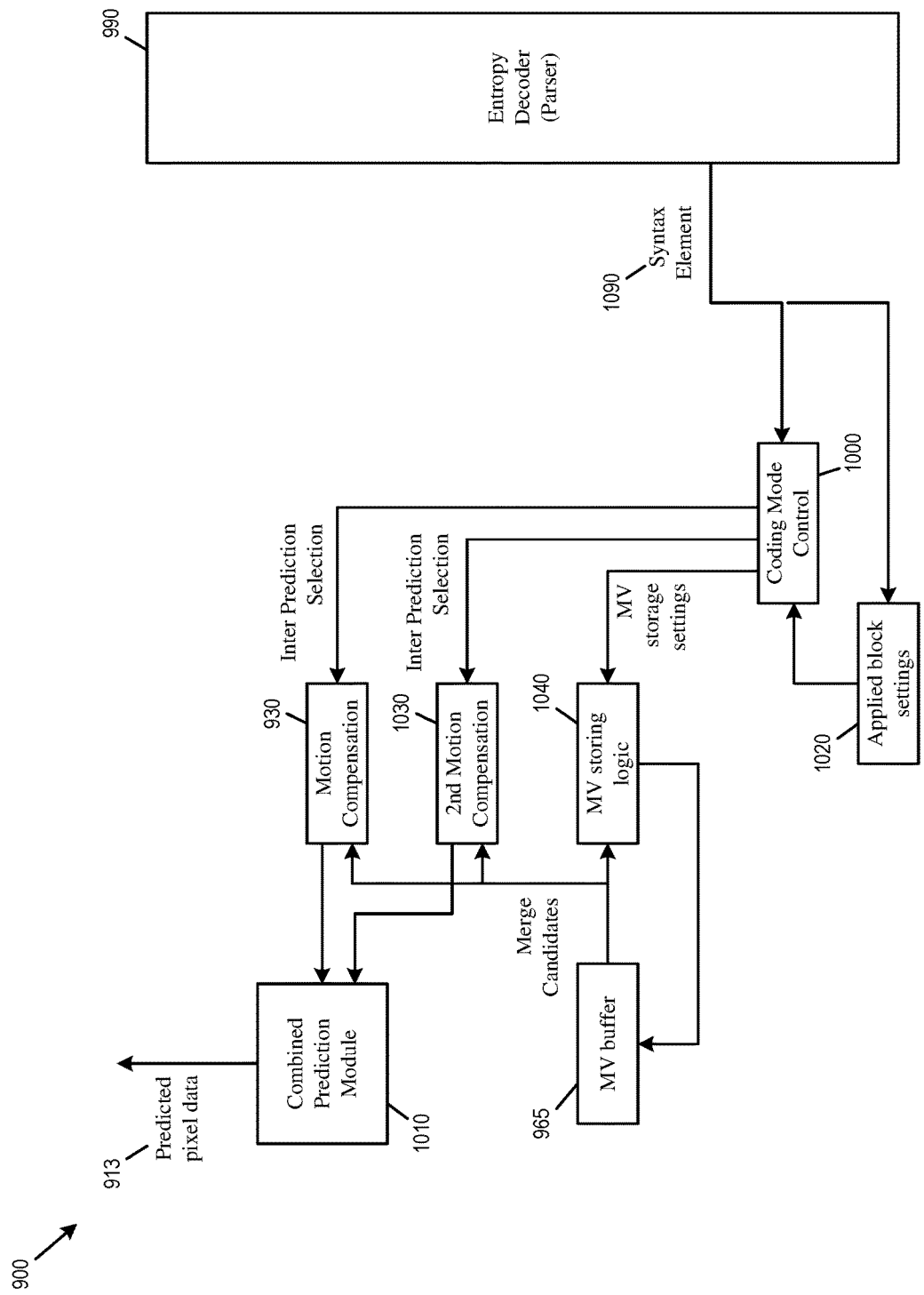
FIG. 10 illustrates portions of the video decoder that implement target merge mode.

FIG. 10 illustrates portions of the video decoder 900 that implement target merge mode (including triangular prediction unit mode). As illustrated, the video decoder 900 implements a combined prediction module 1010, which produces the predicted pixel data 913. The combined prediction module 1010 may receive inter-prediction values from the motion compensation module 930, as well as a second motion compensation module 1030.

The MV buffer 965 provides the merge candidates to the motion compensation modules 930 and 1030. The MV buffer 965 stores the motion information and the mode directions used to decode the current block for use by subsequent blocks.

A MV storage logic 1040 determines or computes the motion information to be stored in the MV buffer 965. For example, when TPM is enabled, the MV storage logic may decide whether to store Motion1 (the motion vector and reference index of PU1) or Motion2 (the motion vector and reference index of PU2) or a combination of Motion1 and Motion 2 (average of Mv1 and Mv2 and a derived or pre-define reference index). The MV storage logic 1040 may divide the current CU into (e.g., 4×4) grids and computes the motion information to store for each grid based on the position of the grid. For example, for a grid located in the overlap prediction region 130, the MV storage logic 1040 stores a boundary motion vector that is determined based on Motion1 and/or Motion2. Such a boundary motion information may be selected to be either Motion1 or Motion2 based on a predefined rule, or be computed as the combination of Motion1 and Motion2 with an average of Mv1 or Mv2 and reference index based on a predefined rule. Such predefined rules may weigh Mv1 and Mv2 based on their respective POCs, the position of the grid for which the motion information is computed, etc.

A coding mode (or tool) control module 1000 controls the operations of the motion compensation module 930, and the second motion compensation module 1030. The coding mode control module 1000 may enable the motion compensation module 930 and the second motion compensation module 1030 to implement a target merge mode with multi-hypothesis prediction based on two inter-predictions, such as TPM. The coding mode control module 1000 determines which coding modes to enable and/or disable for coding the current block. The coding mode control module 1000 also determines which merge candidates to use for each grid or partition of the current block. The coding mode may decide which coding mode(s) to enable or disable based on a set of applied block settings 1020 (e.g., the width, the height, and/or the area of the block). The coding mode control 1000 may receive syntax elements 1090 from the entropy decoder 990. The syntax elements 1090 may be used to indicate whether a target merge mode is enabled or not. The syntax element 1090 may be bypassed when the applied block settings 1020 fails to meet certain criteria or threshold. When the syntax element 1090 is signaled and the target merge mode is enabled, more syntax elements containing an index indicating the direction for splitting the CU into two prediction units and/or two indices indicating the motion candidates of the two prediction units may be signaled.

Figure 11:
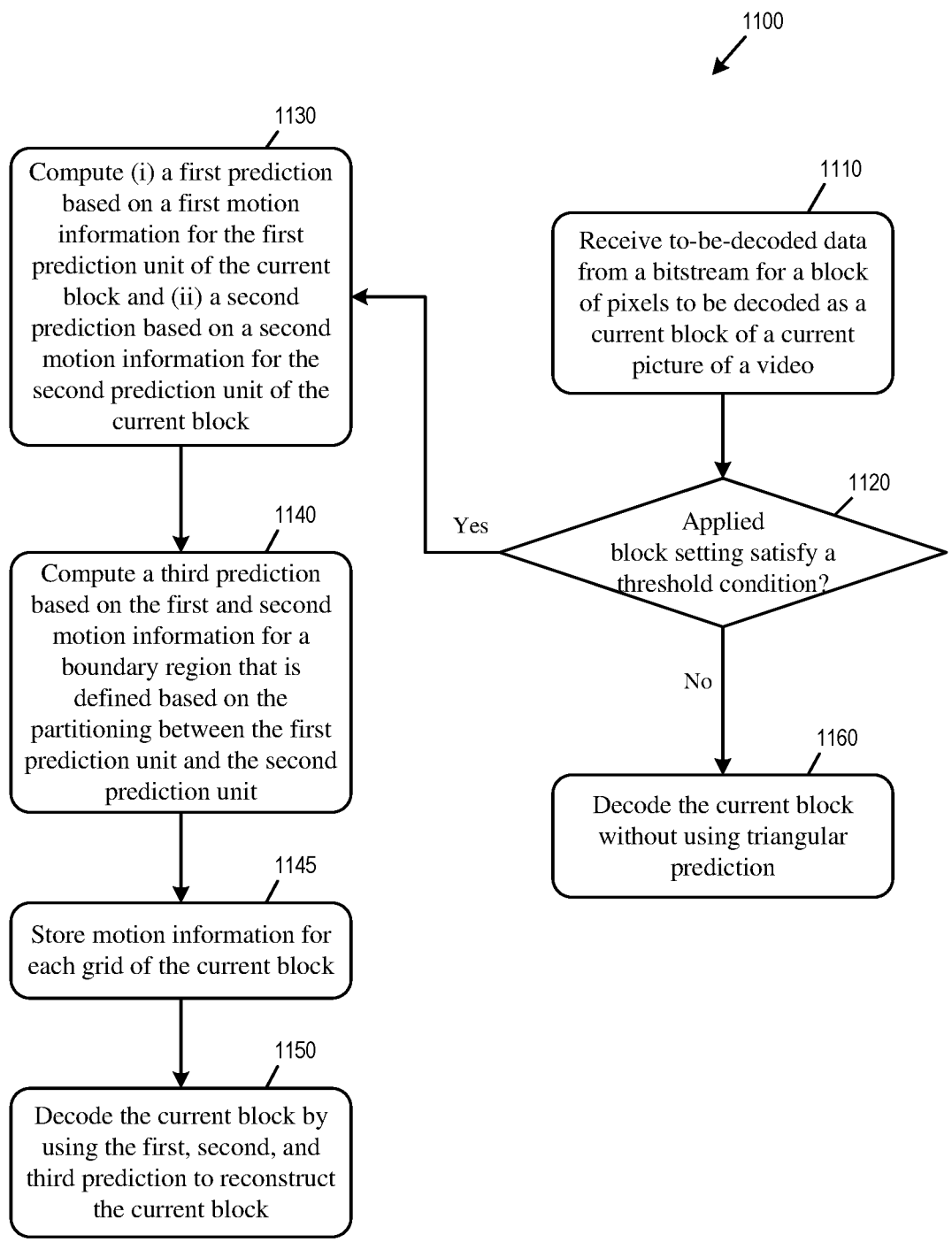
FIG. 11 conceptually illustrates a process that for performing target merge mode at a decoder.

FIG. 11 conceptually illustrates a process 1100 that for performing target merge mode (including triangular prediction mode) at a decoder. In some embodiments, one or more processing units (e.g., a processor) of a computing device implementing the video decoder 900 performs the process 1100 by executing instructions stored in a computer readable medium. In some embodiments, an electronic apparatus implementing the video decoder 900 performs the process 1100.

The video decoder receives (at block 1110) to-be-decoded data from a bitstream for a block of pixels to be decoded as a current block of current picture of a video. The video decoder determines (at block 1120) whether a set of applied block settings of the current block satisfies a threshold condition. The set of applied block settings may include a width, a height, an area, or a ratio (of the long side to the short side) of the current block. In some embodiments, the set of applied block settings satisfies the threshold condition when the width, the height, the area, or the long side to short side ratio of the current block is greater than a threshold. In some embodiments, the set of applied block settings satisfies the threshold condition when the width, the height, the area, or the long side to short side ratio of the current block is less than a threshold. When the set of applied block settings of the current block satisfies the threshold condition, the process 1100 proceeds to 1130 to decode the current block by using triangular prediction. When the set of applied block settings of the current block does not satisfy the threshold condition, the process proceeds to 1160 to decode the current block without using triangular prediction.

The video decoder computes/generates (at block 1130) a first prediction based on a first motion information (that refer to a first reference picture) for the first prediction unit of the current block. The video decoder also computes/generates a second prediction based on a second motion information (that refer to a second reference picture) for the second prediction unit of the current block. The video decoder may compute/generate the first and second predictions independently and/or in parallel. In some embodiments, the partitioning of the first and second prediction units is along a straight line bifurcating the current block. In some embodiments, the partitioning straight line is a diagonal line connecting two opposing vertices of the current block. In some other embodiments, the straight line may be any other line to partition the current block into two prediction units, which should not be limited in this disclosure.

The video decoder computes/generates (at block 1140) a third prediction based on the first and second motion information for an overlap prediction region (e.g., 130) that is defined based on the partitioning between the first prediction unit and the second prediction unit.

The video decoder stores (at block 1145) motion information for each grid of the current block. In some embodiments, the current block is divided into (e.g., 4-pixel by 4-pixel) grids, and motion information is stored for each grid for use by subsequent blocks to perform operations such as merge mode. In some embodiments, a boundary motion information is stored for a boundary grid located in the overlap prediction region of the current block. The boundary motion information is determined based on the first motion vector and the second motion vector. In some embodiments, the first motion information is selected as the boundary motion information when a first picture order count (POC) difference between the first reference picture and the current picture is less than a second POC difference between the second reference picture and the current picture, and the second motion information is selected as the boundary motion information when the second POC difference is less than the first POC difference. In some embodiments, the boundary motion information is computed by averaging the first motion vector and the second motion information. Each of the first and second motion information may be weighted based on a spatial position of the boundary grid relative to a first grid in which the first motion information is applied to compute the first prediction or a second grid in which the second motion information is applied to compute the second prediction. In some embodiments, at least one of the first and second motion information is scaled based on a POC of the first reference picture, a POC of the second reference picture, and a POC of the current picture when computing the boundary motion information by averaging the first and second motion information.

The video decoder decodes (at block 1150) the current block by using the first, second, and third predictions to reconstruct the current block.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
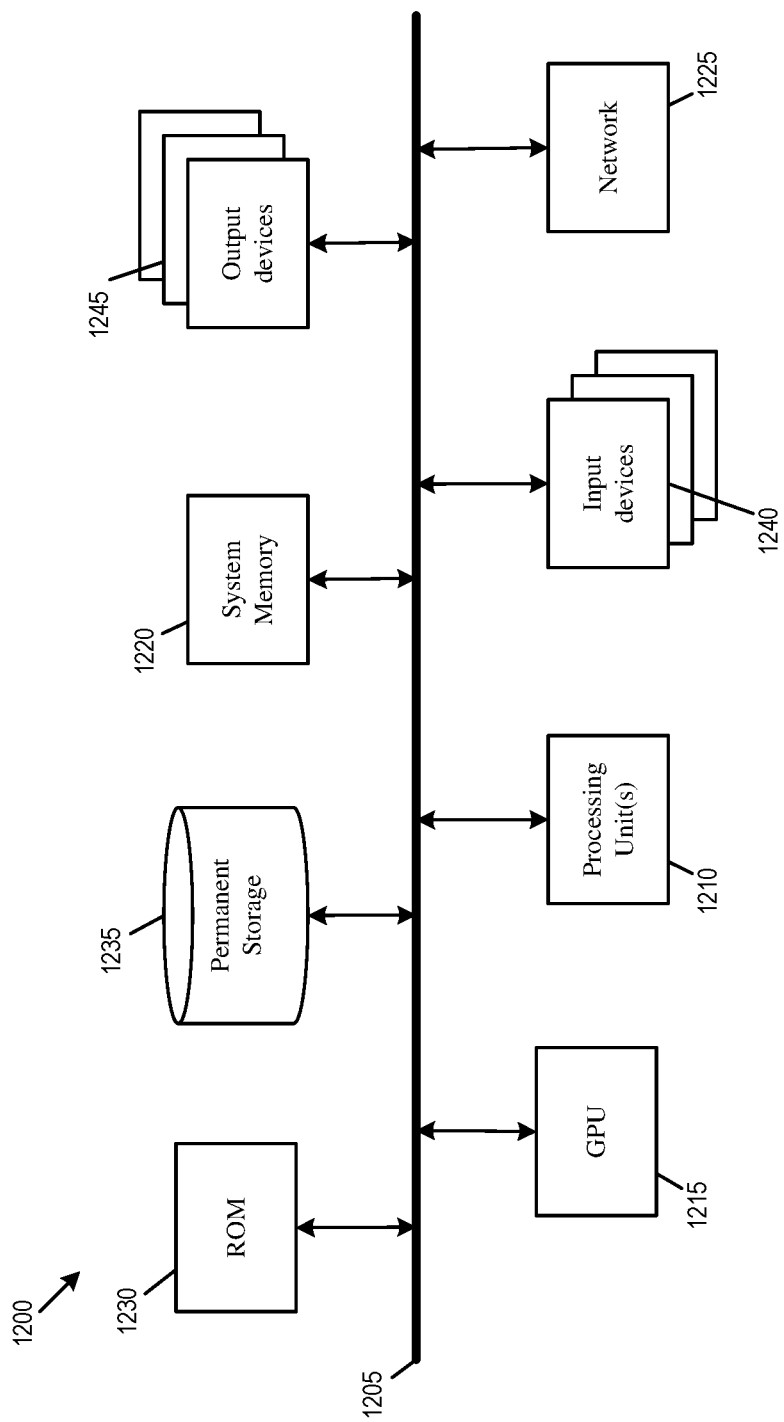
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
receiving to-be-decoded data from a bitstream for a block of pixels to be decoded as a current block of a current picture of a video;
generating (i) a first prediction based on a first motion information for a first prediction region of the current block and (ii) a second prediction based on a second motion information for a second prediction region of the current block;
generating a third prediction based on the first and second motion information for an overlap prediction region that is defined based on a partitioning between the first prediction region and the second prediction region; and
storing a boundary motion information for a boundary grid located in the overlap prediction region to be used for decoding a subsequent block of pixels, wherein the boundary motion information is determined based on the first motion information or the second motion information, wherein the first motion information contains a first motion vector and reference index, and the second motion information contains a second motion vector and reference index.

2. The video decoding method of claim 1, only one of the first and second motion vectors is predefined to be stored as the boundary motion information when the first motion information and the second motion information have a same reference list.

3. The video decoding method of claim 1, wherein a uni-prediction motion information is derived from only one of the first and second motion vectors and the uni-prediction motion information is predefined to be stored as the boundary motion information when the first motion information and the second motion information have a same reference list.

4. The video decoding method of claim 1, wherein the first motion information is derived by using a first parsed index and a candidate list, and the second motion information is derived by using a second parsed index and the candidate list.

5. A video encoding method comprising:
receiving raw pixel data for a block of pixels to be encoded as a current block of a current picture of a video into a bitstream;
generating (i) a first prediction based on a first motion information for a first prediction region of the current block and (ii) a second prediction based on a second motion information for a second prediction region of the current block;
generating a third prediction based on the first and second motion information for an overlap prediction region that is defined based on a partitioning between the first prediction region and the second prediction region; and
storing a boundary motion information for a boundary grid located in the overlap prediction region to be used for encoding a subsequent block of pixels, wherein the boundary motion information is determined based on the first motion information or the second motion information, wherein the first motion information contains a first motion vector and reference index, and the second motion information contains a second motion vector and reference index.

6. An electronic apparatus comprising:
a video decoder circuit configured to perform operations comprising:
receiving to-be-decoded data from a bitstream for a block of pixels to be decoded as a current block of a current picture of a video;
generating (i) a first prediction based on a first motion information for a first prediction region of the current block and (ii) a second prediction based on a second motion information for a second prediction region of the current block;
generating a third prediction based on the first and second motion information for an overlap prediction region that is defined based on a partitioning between the first prediction region and the second prediction region; and
storing a boundary motion information for a boundary grid located in the overlap prediction region to be used for decoding a subsequent block of pixels, wherein the boundary motion information is determined based on the first motion information or the second motion information, wherein the first motion information contains a first motion vector and reference index, and the second motion information contains a second motion vector and reference index.

* * * * *